(12) United States Patent
Cavalcabo et al.

(10) Patent No.: US 11,660,676 B2
(45) Date of Patent: May 30, 2023

(54) HOUSING ALIGNMENT AND VIBRATION ISOLATION

(71) Applicant: TRUMPF SISMA S.R.L., Schio (IT)

(72) Inventors: Guglielmo Cavalcabo, Milan (IT); Alessio Guzzonato, Schio (IT)

(73) Assignee: TRUMPF SISMA S.R.L., Schio VI (IT)

( * ) Notice: Subject to any disclaimer, the term of this patent is extended or adjusted under 35 U.S.C. 154(b) by 0 days.

(21) Appl. No.: 17/331,141

(22) Filed: May 26, 2021

(65) Prior Publication Data

US 2021/0370407 A1 Dec. 2, 2021

(30) Foreign Application Priority Data

May 28, 2020 (EP) .................................. 20177005

(51) Int. Cl.
*B33Y 30/00* (2015.01)
*B29C 64/153* (2017.01)
*B29C 64/25* (2017.01)
*B22F 12/00* (2021.01)
*B22F 10/28* (2021.01)

(52) U.S. Cl.
CPC .............. *B22F 12/38* (2021.01); *B22F 10/28* (2021.01); *B29C 64/153* (2017.08); *B29C 64/25* (2017.08); *B33Y 30/00* (2014.12)

(58) Field of Classification Search
CPC .................................. B22F 12/38; B29C 64/25
See application file for complete search history.

(56) References Cited

U.S. PATENT DOCUMENTS

| 6,554,600 | B1 | 4/2003 | Hofmann et al. | |
|---|---|---|---|---|
| 7,837,458 | B2 | 11/2010 | Perret et al. | |
| 2007/0057412 | A1* | 3/2007 | Weiskopf | B33Y 30/00 425/375 |
| 2020/0086570 | A1* | 3/2020 | Kremer | B29C 64/268 |
| 2020/0254524 | A1 | 8/2020 | Pieger et al. | |

(Continued)

FOREIGN PATENT DOCUMENTS

| DE | 102010050359 | 5/2012 |
|---|---|---|
| DE | 102017124424 | 4/2019 |
| EP | 1704989 | 9/2006 |

(Continued)

OTHER PUBLICATIONS

EP European Search Report in European Appln. No. 20177005, dated Nov. 13, 2020, 3 pages.

*Primary Examiner* — Leith S Shafi
*Assistant Examiner* — Nicholas J Chidiac
(74) *Attorney, Agent, or Firm* — Fish & Richardson P.C.

(57) ABSTRACT

The disclosure provides machines for manufacturing three-dimensional components by selectively solidifying powdery build-up material with a process beam in a process chamber, and methods of making the machines. The machine includes a machine base frame, wherein the machine base frame has a machine frame and a supporting frame which is attachable thereto, wherein the supporting frame accommodates at least one process chamber or at least one construction cylinder, and at least one interface is formed between the supporting frame and the machine frame, by which interface the supporting frame is held with respect to the machine frame.

13 Claims, 6 Drawing Sheets

(56) References Cited

U.S. PATENT DOCUMENTS

2020/0276640 A1* 9/2020 Huebinger ............ B29C 64/232
2022/0297375 A1* 9/2022 Gjovik ................. B29C 64/227

FOREIGN PATENT DOCUMENTS

| EP | 1925435 | 5/2008 | |
| EP | 3492243 | 6/2019 | |
| WO | 2019096421 A1 † | 5/2019 | |
| WO | WO-2019096421 A1 * | 5/2019 | .............. B22F 10/20 |

* cited by examiner
† cited by third party

HOUSING ALIGNMENT AND VIBRATION ISOLATION

CROSS REFERENCE TO RELATED APPLICATIONS

This application claims priority under 35 U.S.C. § 119 from European Patent Application No. 20177005.4, filed on May 28, 2020, the entire contents of which is incorporated herein by reference.

TECHNICAL FIELD

The disclosure relates to machines for manufacturing three-dimensional components by layer-by-layer solidification of powdered build-up material with a process jet, and methods for making the machines.

BACKGROUND

EP 1 925 435 B1 discloses a device for layer-by-layer production of a three-dimensional object. This device comprises a machine frame. A process chamber with a working plane is provided on the machine frame. Furthermore, the machine frame accommodates an energy source for generating a process beam, which is guided into the process chamber via deflecting mirrors and a scanner. In the working plane, a build-up cylinder with a substrate plate that can be moved vertically is provided, on which the three-dimensional object is created by layer-by-layer solidification of a build-up material applied in layers by the process beam. To ensure that this device cannot tip over, support feet are provided on the machine frame and form a three-point support on the substrate. The machine base frame has a triangular design with three base supports to which the support feet are attached.

DE 10 2017 124 424 A1 describes a machine for the production of three-dimensional components by layer-by-layer solidification of powdery build-up material by a process beam. This machine comprises a machine frame. All components for the construction of this device are attached to this machine frame.

The quality requirements for the production of such three-dimensional components are constantly increasing.

SUMMARY

The present disclosure provides machines for the manufacture of three-dimensional components, in which an increased positioning accuracy of the process beam is made possible during the production of the three-dimensional components, as well as methods of making the machines.

In a first aspect, the disclosure provides machines including a machine frame and a supporting frame that accommodates at least one process chamber with a working plane or at least one construction cylinder. At least one interface is provided between the supporting frame and the machine frame, by which the supporting frame is attached or connected to the machine frame. This interface makes it possible to decouple the supporting frame from the machine frame, and decouples influences from the machine frame, such as thermal stresses, mechanical stresses, vibrations, shocks during transport of the machine, etc. from the supporting frame. This mechanical interface enables the supporting frame to be accommodated in the machine frame without any tension, which enables improved precision in the manufacture of three-dimensional components. In addition, the mechanical interface can decouple heat transfer and/or vibrations that impair quality during the production of three-dimensional components.

According to certain embodiments, at least one interface is provided by a three-point support between the machine frame and the supporting frame. This three-point support can be used to ensure stable mounting and alignment of the supporting frame with the machine frame.

The three-point support can be designed with detachable connection arrangements, which has the advantage that the supporting frame can be easily assembled to and disassembled from the machine frame. The supporting frame can also be easily adjusted and/or aligned with the machine frame.

The supporting frame can be attached or connected to the machine frame only by the three-point support, which enables the supporting frame to be supported by the main frame in a stress-free manner, e.g., the supporting frame can be freely hung in the machine frame. All of the forces resulting from the supporting frame are carried by the machine frame via the three-point support.

The detachable connection arrangements can be provided between a support section provided on the machine frame and at least one support portion provided on the supporting frame. The support section and the support portion can be aligned with each other in the vertical direction. This allows for a simple design.

The detachable connection arrangements can include a pin that is connected at one end section by a clamp or screw connection to the support section on the machine frame and at the opposite end section by a clamp or screw connection to the support portion on the supporting frame. This detachable connection arrangement is simple in construction, can allow a high mechanical load absorption to carry the weight of the supporting frame together with the components and/or parts absorbed by it, and can transfer the load to the machine frame.

The at least one detachable connection arrangement can include at least one compensating element for aligning the longitudinal axis of the pin in the interface. Thus, an angular compensation can be given in the position of the pin between the supporting portion of the machine frame and the supporting portion on the supporting frame. Furthermore, this can reduce tension between the supporting frame and machine frame. These compensating elements can be formed by, e.g., two discs lying one on top of the other, wherein one disc has a convex surface that lies against a concave surface on the opposite disc.

In another embodiment, the supporting frame includes a base frame, e.g., a closed base frame, from which two opposing sidewall support structures extend, which are structured with a rear wall and can form a U-shaped frame structure. At least one support portion is provided on each outer side of the sidewall support structures, e.g., on each outer side of each sidewall support structure. This design enables the supporting frame to be constructed in a mechanically stable manner to compensate for the forces occurring during the working process by, e.g., a traversing movement of the substrate plate in the build-up cylinder, a traversing movement of the working cylinder for dispensing a powdery build-up material from a storage container, or the traversing movement of a levelling and compensating element along a working plane in the process chamber.

The machine frame of the machine includes a base support on which a supporting frame structure is built up from several longitudinal and/or transverse profiles, e.g., struts. A receiving space for the supporting frame is formed between two longitudinal profiles lying opposite each other in pairs, and at least one support section is provided on each of the pairs of longitudinal profiles. This structure of the supporting structure enables the supporting frame to be easily inserted into the machine frame. The supporting frame can already be completed with the components to be accommodated.

The supporting frame can be connected between the support portion of one sidewall support structure and the support section of the machine frame by a single detachable connecting arrangement, and can be connected to the opposite sidewall support structure between the support portion of the support structure and the support section of the machine frame by two detachable connecting elements arranged at a distance from each other. This can provide a stable three-point support and mechanical decoupling between the supporting frame and the machine frame.

One detachable connecting arrangement can provided on the one sidewall support structure centrally to the two opposite detachable connecting arrangements of the opposite sidewall support structure, which are arranged at a distance from each other. This allows a statically determined arrangement of the supporting frame to the machine frame.

DESCRIPTION OF DRAWINGS

The machines and further embodiments are described and explained in more detail below with reference to the drawings. The features to be taken from the description and the drawings can be applied individually on their own or in any combination.

DETAILED DESCRIPTION

Figure 1:
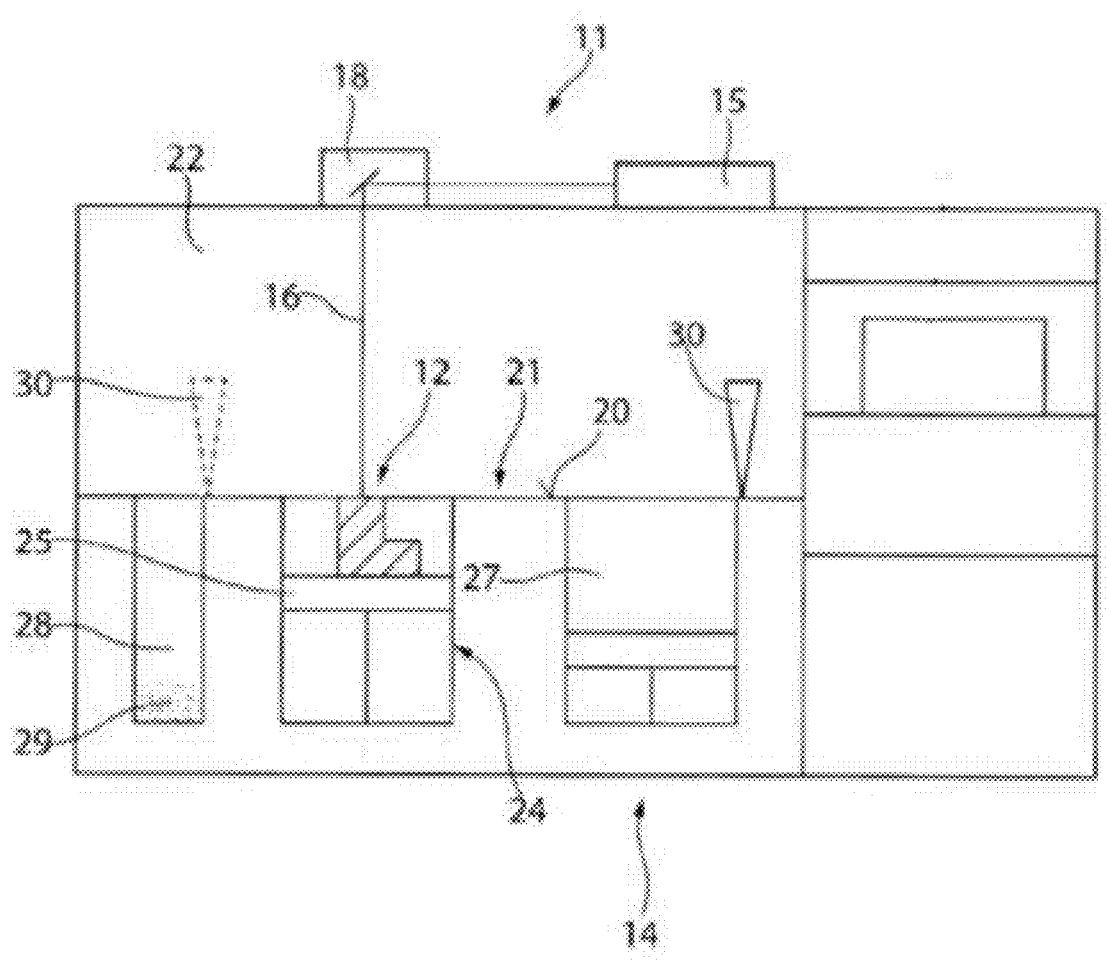
FIG. 1 is a schematic view of a machine for the production of three-dimensional components, as described herein.

FIG. 1 shows a schematic view of a machine 11 for the production of a three-dimensional component 12 by successive solidification of layers of a powdery build-up material 29. This machine 11 comprises a machine base frame 14 and a beam source 15, e.g., a laser source, arranged on the machine frame 14. This beam source 15 emits a process beam 16, e.g., a laser, which is deflected and guided via a beam deflection device 18 onto a working plane 20 of a working surface 21 in a process chamber 22. The beam deflection device 18 can be designed in the form of one or more controllable mirrors, e.g., in the form of a scanner. Below the working plane 20, a construction cylinder 24 with a substrate plate 25 is provided, which can be moved within the construction cylinder 24 to create the three-dimensional component 12. Powdered construction material 29 is provided through a storage chamber 27, which is adjacent to the construction cylinder 24. A collecting chamber 28 is provided on the opposite side of the construction cylinder 24. Powdered construction material 29 is fed to construction cylinder 24 by an application and levelling device 30 from a right-hand starting position shown in FIG. 1. The application and levelling device 30 transfers unneeded construction material 29 to the collecting chamber 28 (at the left-hand position) so that it can be processed and reused.

The construction material 29 can consist of a metal or ceramic powder. Other materials known in the art and suitable for laser melting and laser sintering can also be used. The process chamber 22 can be hermetically sealed. The process chamber 22 is filled with inert gas for the production of the three-dimensional component 12 to avoid oxidation when melting the build-up material 29.

Figure 2:
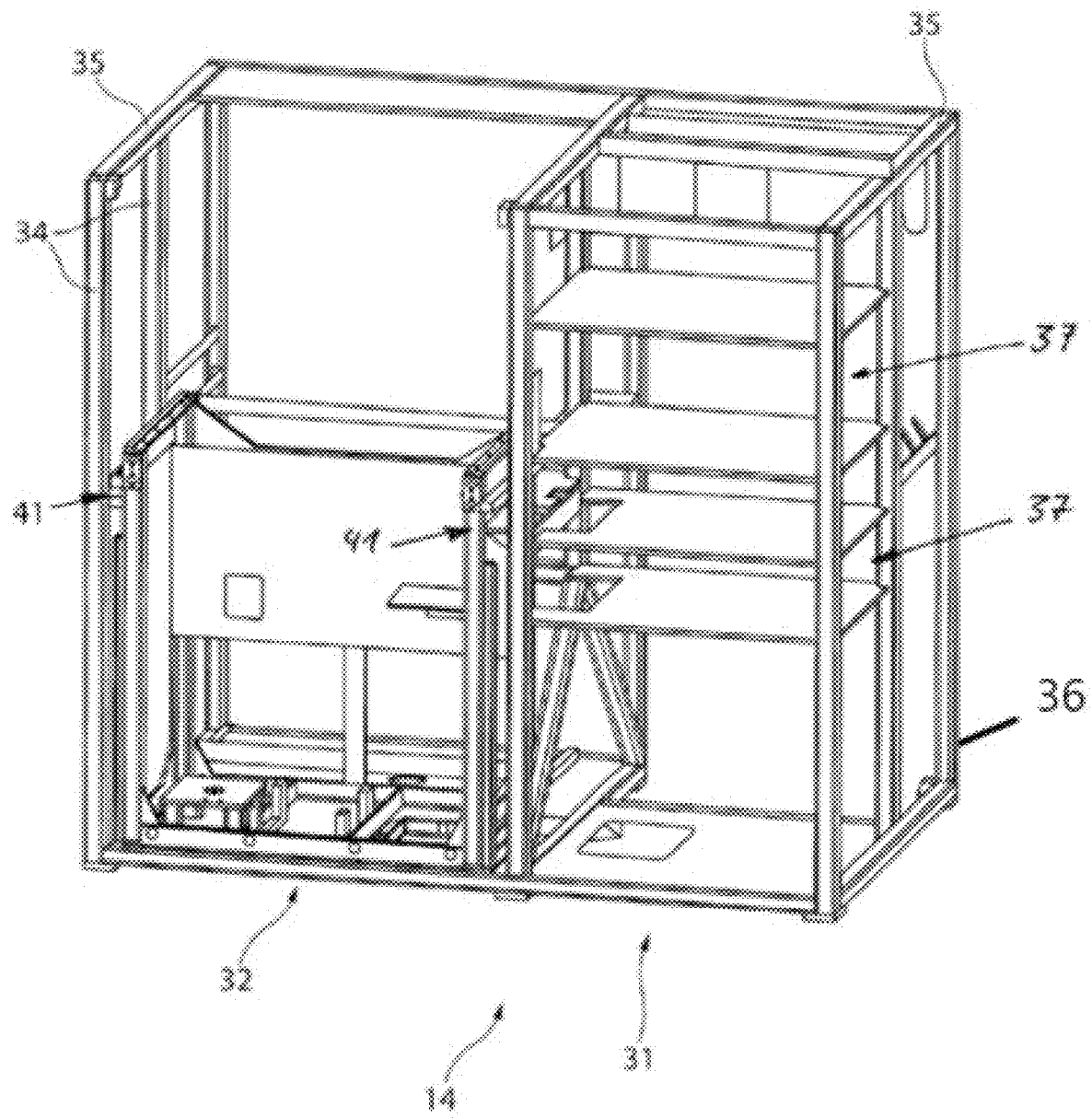
FIG. 2 is a schematic view of a machine base frame of a machine for the production of three-dimensional components with a machine frame and a supporting frame, as described herein.

FIG. 2 shows a perspective view of the machine base frame 14 without further components. This machine base frame 14 includes a machine frame 31 and a supporting frame 32, which is positioned in the machine frame 31. The machine frame 31 is made up of several longitudinal profiles 34 and/or transverse profiles 35. These can be bolted, riveted together, and/or connected by a clamp connection. In an area adjacent to the supporting frame 32, one or more slide-in modules 37 are formed, e.g., to position electrical components such as a control device and/or data processing device or the like.

At least one interface 41 is formed between the machine frame 31 and the supporting frame 32. This at least one interface 41 makes it possible for the supporting frame 32 to be positioned in a stress-free arrangement (e.g., a deformation-free arrangement) with respect to the machine frame 31.

Figure 3:
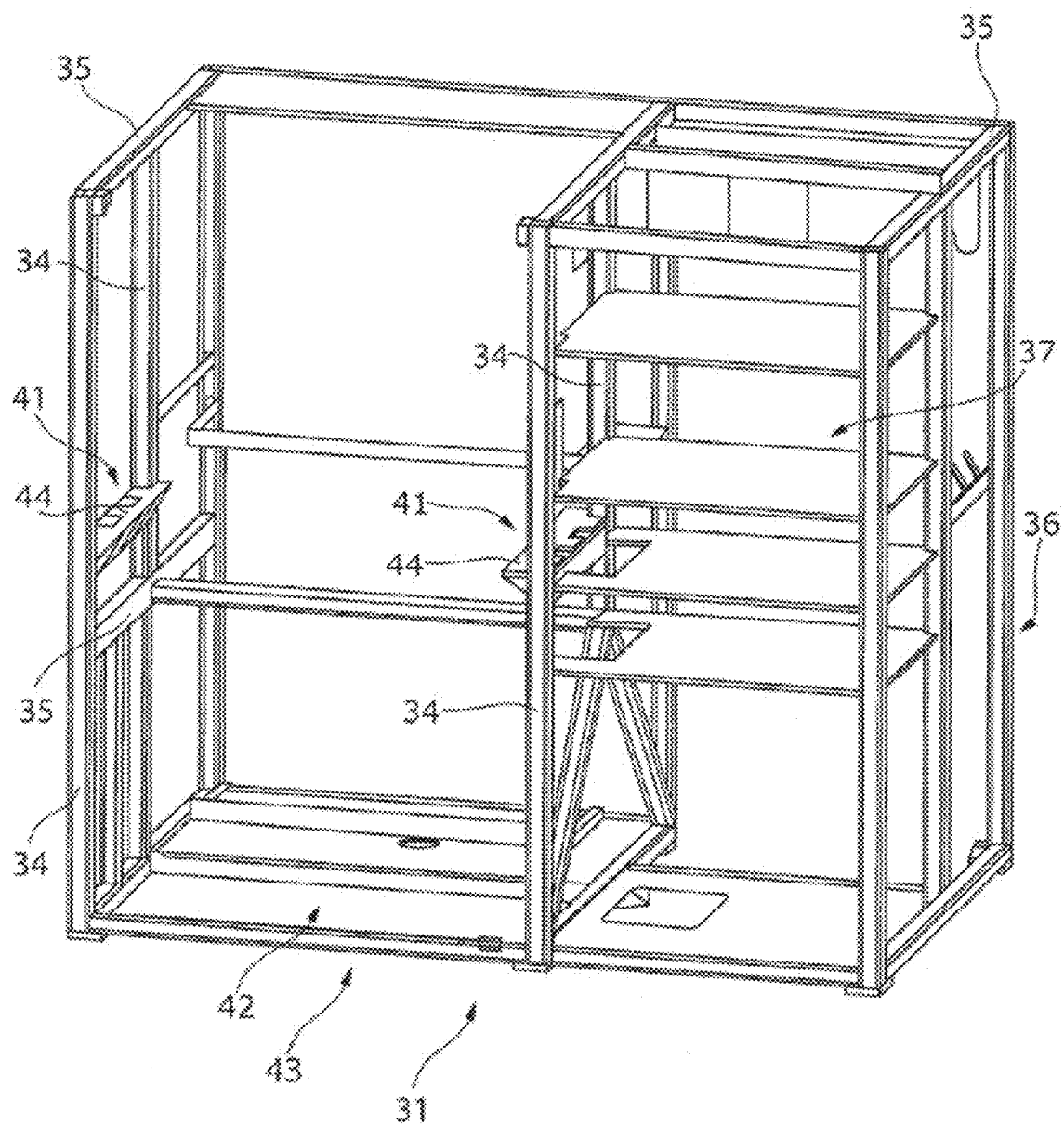
FIG. 3 is a perspective view of the machine frame as shown in FIG. 2.

FIG. 3 shows a perspective view of the machine frame 31 without the supporting frame 32. The machine frame 31 has a receiving space 42 in which the supporting frame 32 can be inserted. This receiving space 42 is formed by a base support 43, which has at least two longitudinal profiles 34 on each of its two opposite narrow sides, which form a section of a sidewall or the entire sidewall of the machine frame 31. The longitudinal profiles 34 and transverse profiles 35 form a supporting framework 36 to which components of the machine 11 can be attached or fastened. At least one support section 44 is arranged on or between two longitudinal profiles 34. This support section 44 is aligned horizontally and forms one component of the interface 41. The support section 44 is flat and extends between the two longitudinal profiles 34. In addition, the support section 44 can be supported by at least one stiffener, which also extends between the longitudinal profiles 34 in the horizontal direction and/or in the vertical direction and can be attached to them.

Figure 4:
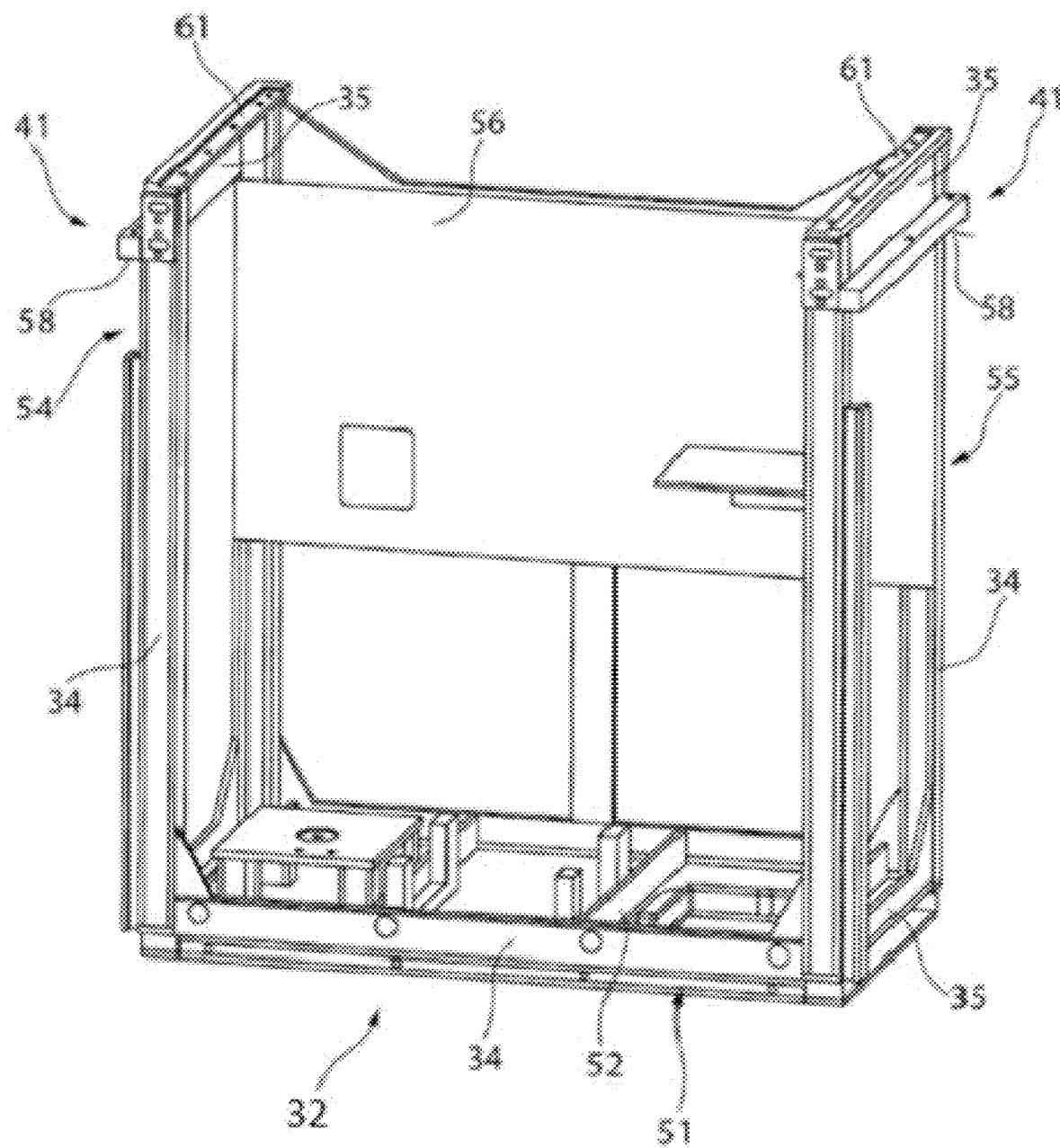
FIG. 4 is a perspective view of the supporting frame as shown in FIG. 2.

FIG. 4 shows a perspective view of the supporting frame 32. This supporting frame 32 comprises a base frame 51, which is, in one example, rectangular in shape. This base frame 51 can be designed as a closed base frame consisting of longitudinal and transverse profiles 34, 35. Stiffening ribs 52 can be provided between the longitudinal profiles 34. A sidewall support structure 54 is provided on the narrow side of the base frame 51. This sidewall support structure 54 can be designed as a closed frame. The longitudinal profiles 34 and transverse profiles 35 can also be provided for this purpose. The sidewall support structures 54, 55 are connected to each other by a rear wall 56. This creates a U-shaped frame structure. The rear wall 56 can be designed in the form of a panel. Alternatively, longitudinal or transverse profiles 34, 35 can also extend between the opposite sidewall support structures 54, 55.

A support portion 58 is provided on each outer side of the sidewall support structure 54, 55. This support portion 58 can be aligned horizontally. This support portion 58 can be attached to a longitudinal or transverse profile 34, 35. This support portion 58 is a further component of the interface 41.

Figure 5:
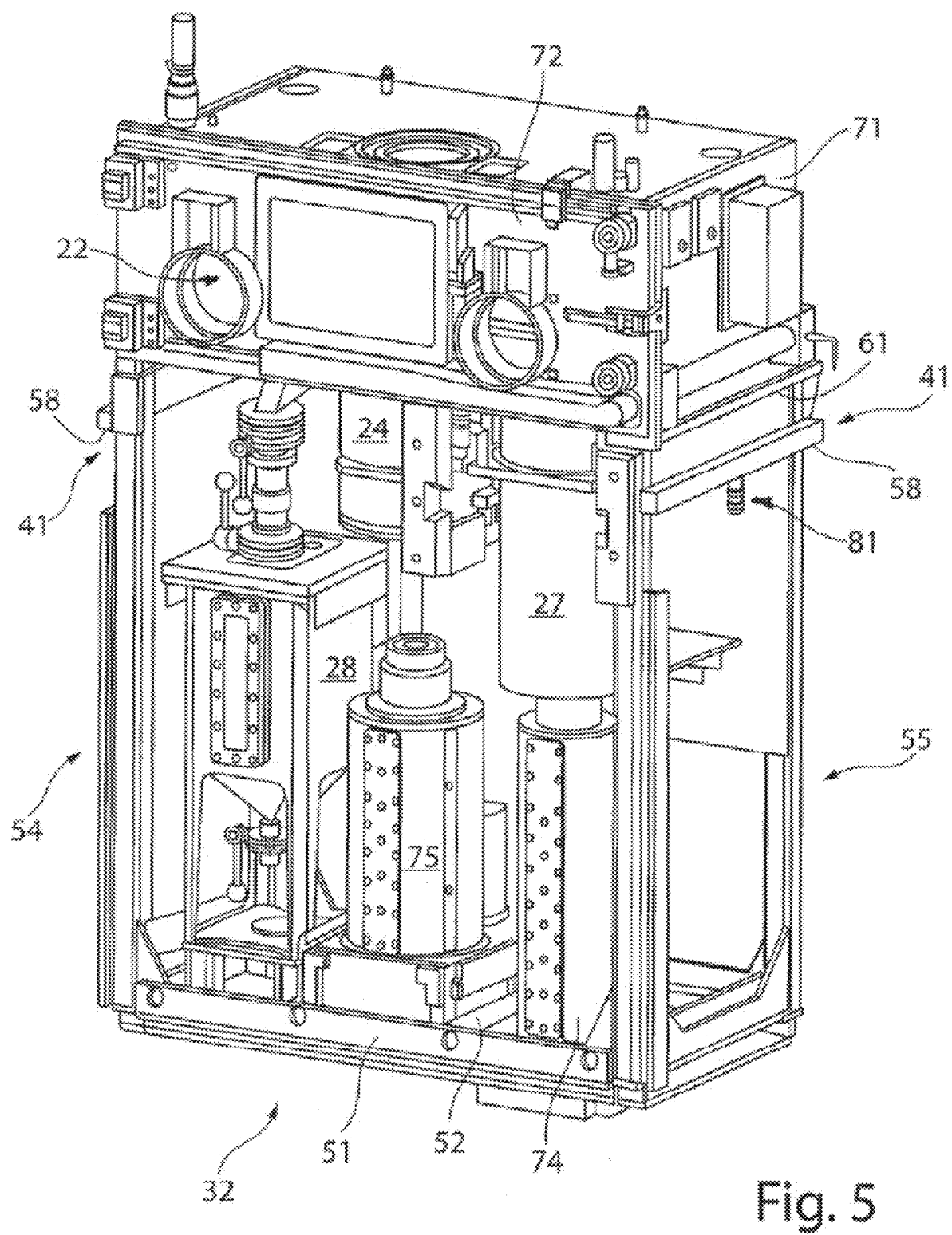
FIG. 5 is a perspective view of the supporting frame as shown in FIG. 4 with components of the device for the production of three-dimensional parts.

FIG. 5 shows a perspective view of the supporting frame 32 as shown in FIG. 4 equipped with components of machine 11. At the upper end of the sidewall support structures 54, 55 there are connection surfaces 61, which serve to accommodate a housing 71 in which the process chamber 22 is provided. This housing 71 can have a door 72 that can be opened from the front side and through which the process chamber 22 is accessible. Working surface 21 is formed on a lower side of the process chamber 22. This working surface 21 is assigned the storage chamber 27 and an associated lifting cylinder 74 to transfer the stored build-up material to the working plane 20. The construction cylinder 24 is provided adjacent to the storage chamber 27. A lifting cylinder 75 for triggering a traversing movement of the substrate plate 25 within the construction cylinder 24 is supported on the base frame 51 of the supporting frame 32. The same applies to the collecting chamber 28, which is supported on a connection surface on the base frame 51. The U-shaped frame structure of the supporting frame 32 is additionally stiffened by the housing 71.

The supporting frame 32 and the components mounted on it can be designed as a pre-assembled unit. This supporting frame 32 equipped with components can be inserted into the machine frame 31. The supporting frame 32 is connected to the machine frame 31 through the interfaces 41. After the insertion of the supporting frame 32 into the machine frame 31, the supporting frame 32 is suspended freely without any connection to the base frame 51 of the machine frame 31, i.e., the supporting frame 32 is connected to the machine frame 31 only through the interfaces 41. At least one detachable connecting arrangement 81 is assigned to each interface 41, and the supporting frame 32 is freely hanging in the machine frame 31 and can be supported only by detachable connection arrangements 81.

Figure 6:
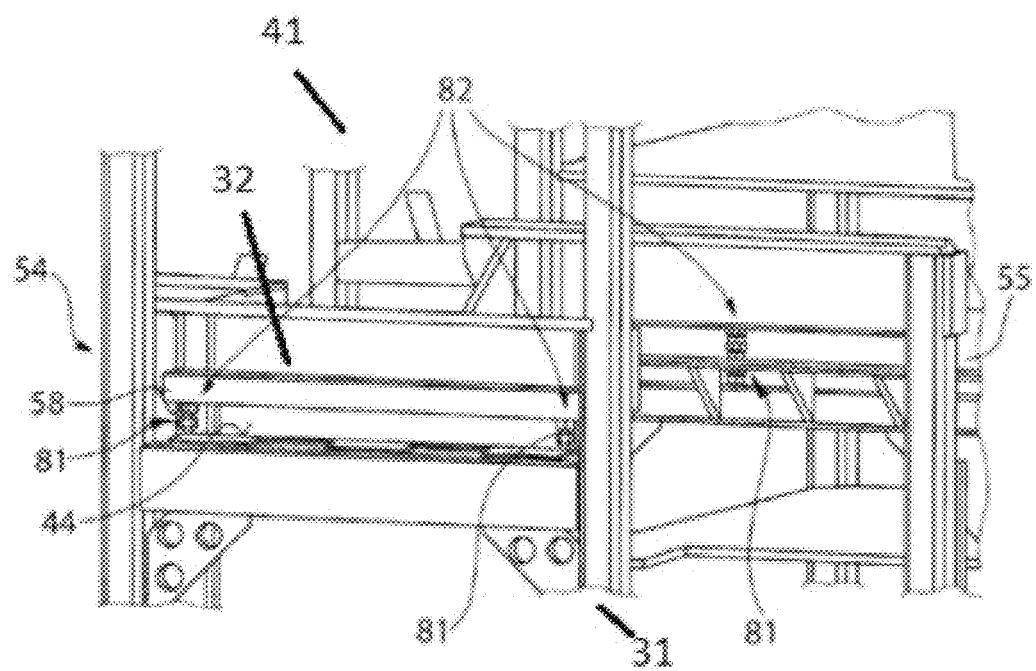
FIG. 6 is a detailed perspective view of an interface between supporting frame and machine frame.

FIG. 6 shows a perspective view of at least one interface 41 between the supporting frame 32 and the machine frame 31. A three-point support 82 is provided between supporting frame 32 and machine frame 31. This three-point support 82 is formed by three detachable connecting arrangements 81. At one interface 41, e.g., at the right-hand side at wall support structure 55, a detachable connection arrangement 81 is provided. Two detachable connection arrangements 81 are provided at the opposite sidewall support structure 54. The detachable connecting arrangements 81, which engage the support section 44 of the machine frame 31 and the support portion 58 of the supporting frame 32, are aligned with one another in a triangular arrangement. The two detachable connecting arrangements 81 at the opposite sidewall support structure 54 are aligned with a distance between them. The one detachable connection assembly 81 provided on the sidewall support structure 55 can be positioned centrally to the two opposite detachable connection assemblies 81. By this statically determined attachment of the supporting frame 32 at its upper end section to the machine frame 31, occurring stresses, deformations, or the like can be decoupled so that they are not transmitted from the machine frame 31 to the process chamber 22, e.g., to the housing 71 of the process chamber 22.

Figure 7:
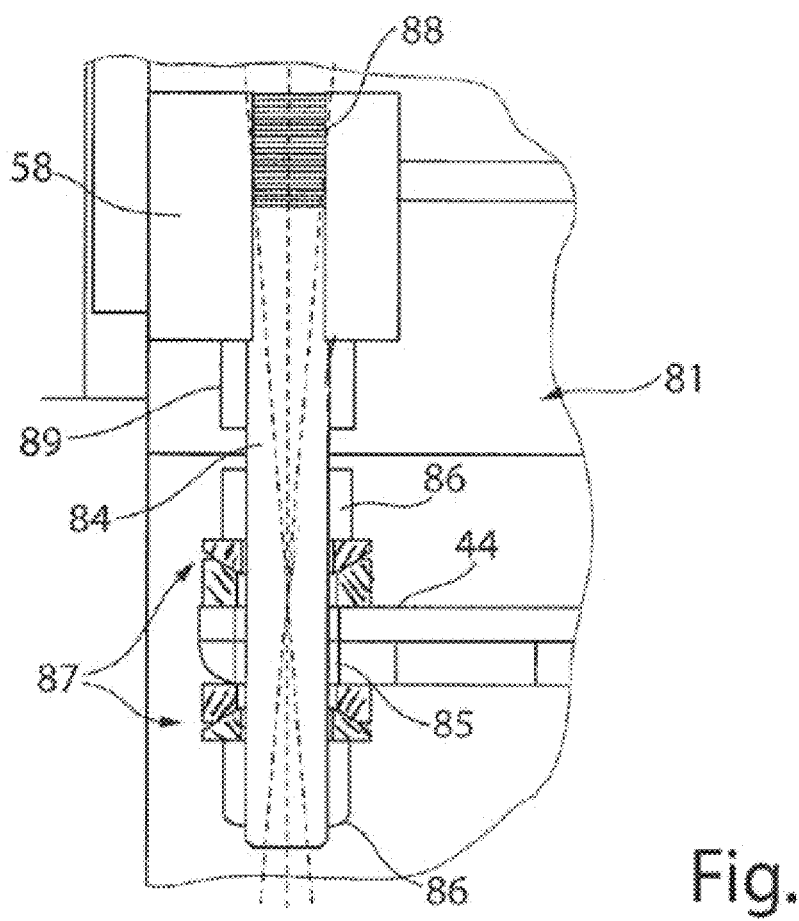
FIG. 7 is a schematic sectional view of a detachable connecting arrangement in the interface as shown in FIG. 6.

FIG. 7 shows a schematic sectional view of an embodiment of the detachable coupling assembly 81. This detachable coupling assembly 81 includes a pin 84, which is positioned in a hole 85 in the support section 44. The pin 84 is coupled to the support section 44 by fastening elements 86, which can be, e.g., screw elements. At least one compensating element 87 is provided between the fastening elements 86 and the support section 44. Such compensating elements 87 provide angle compensation of pin 84, e.g., allowing the longitudinal axis of pin 84 to be aligned in different angular positions with respect to a vertical axis of the support section 44. The opposite end of the pin 84 has a thread 88, which can be mounted, e.g., screwed, in the support portion 58. In addition, the pin 84 can have a further fastening element 89 adjacent to the thread 88. This fastening element 89 is adjustable along the longitudinal axis of the pin 84, e.g., via a further thread provided on the pin 84, and is used to support the support portion 58. Alternatively, the upper end of the pin 84 can be coupled to the support section 58 analogous to the lower end of the pin 84. Alternatively, the detachable connection arrangement 81 can be rotated 180° to the orientation shown in FIG. 7.

This design of the detachable connection arrangement 81 allows a distance to be set in the vertical direction between the support section 44 and the support portion 58. At the same time, the compensating elements 87 can be used to compensate for tolerances if the hole in support portion 58 and the hole in support section 44 are not completely aligned.

Other Embodiments

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A machine for manufacturing three-dimensional components by selectively solidifying powdered build-up material with a process beam in a process chamber, comprising
    a machine base frame comprising a machine frame and a supporting frame that is attachable to the machine frame such that the supporting frame is suspended within the machine frame, wherein the supporting frame accommodates at least one process chamber or at least one construction cylinder; and
    at least one interface arranged between the supporting frame and the machine frame, wherein the at least one interface connects a support portion of the supporting frame to the machine frame, wherein each of the at least one interfaces comprises a pin and two compensating elements, wherein the two compensating elements are positioned on a top surface and a bottom surface, respectively, of the support portion of the supporting frame, and wherein the interface reduces transmission from the machine frame to the supporting frame of any one or more of mechanical stress, thermal stress, vibration, and shock;
    wherein the supporting frame is connected to the machine frame only by the at least one interface.

2. The machine of claim 1, wherein the pin is connected at one end portion by clamping or screwing to the support section of the machine frame and at the opposite end portion by clamping or screwing to the support portion of the supporting frame.

3. The machine of claim 1, wherein the-compensating elements align a longitudinal axis of the pin in the interface.

4. The machine of claim 1, wherein the machine frame has a base support on which a supporting framework is constructed from a plurality of longitudinal profiles which are opposite one another in pairs, wherein between two longitudinal profiles a receiving space for the supporting frame is formed and at least one support section is provided.

5. The machine of claim 1, wherein the at least one interface comprises a three-point support between the machine frame and the supporting frame.

6. The machine of claim 5, wherein the three-point support comprises one or more detachable connecting arrangements.

7. The machine of claim 6, wherein the one or more detachable connecting arrangements are located between a support section provided on the machine frame and the support portion provided on the supporting frame.

8. The machine of claim 1, wherein the supporting frame has a base frame on a floor side, wherein two sidewall support structures opposite one another extend from the base frame, wherein the two sidewall support structures are stiffened with a rear wall, and wherein a support portion is provided on each of the sidewall support structures.

9. The machine of claim 8, wherein the sidewall support structures and the rear wall form a U-shaped frame structure.

10. The machine of claim 8, wherein a support portion is provided on each outer side of the sidewall support structure.

11. The machine of claim 1, wherein the supporting frame comprises:
a single detachable connection arrangement at an upper end portion of one sidewall support structure between the support portion of the one sidewall support structure and a support section of the machine frame; and
two detachable connection arrangements spaced apart from each other at the opposite sidewall support structure between the support portion and a second support section of the machine frame.

12. The machine of claim 11, wherein the single detachable connection arrangement located in the interface is aligned centrally between the two detachable connection arrangements at the opposite sidewall support structure.

13. A method of attaching a first frame to a second frame, wherein the frames are part of a machine for manufacturing three-dimensional components by selectively solidifying powdered build-up material with a process beam in a process chamber, the method comprising:
screwing at least one pin to the first frame to couple the pin to the first frame;
providing angle compensation to the at least one pin via two compensating elements, wherein a longitudinal axis of the pin is allowed to be aligned in different angular positions with respect to a vertical axis of the first frame; and
screwing the at least one pin to the second frame to couple the pin to the second frame wherein the second frame accommodates at least one process chamber or at least one construction cylinder;
thereby attaching the first frame to the second frame while decoupling influences from the first frame to the second frame, wherein the second frame is suspended within the first frame;
wherein the two compensating elements are positioned on a top surface and a bottom surface of the second frame, respectively, and wherein the at least one pin and two compensating elements form at least one interface that decouples influences from the first frame to the second frame, wherein the influences comprise any one or more of mechanical stress, thermal stress, vibration, and shock, wherein the second frame is connected to the machine frame only by the at least one interface.

* * * * *